Figure 3:
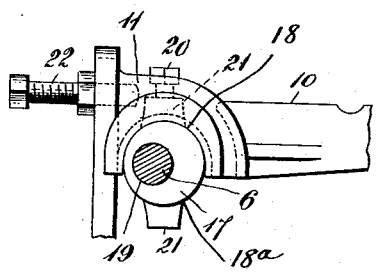

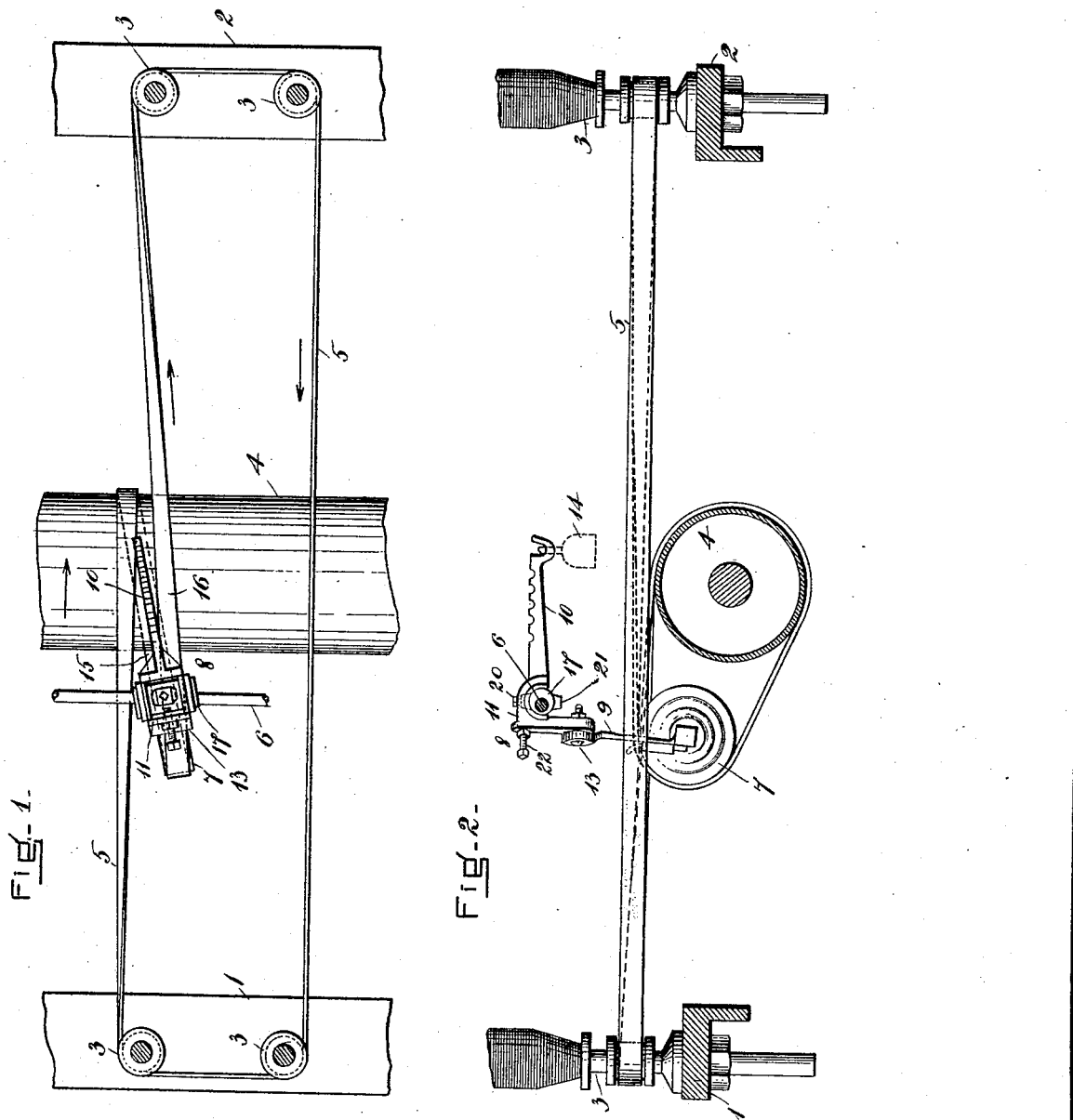

A. W. THOMPSON.
SPINDLE DRIVE MECHANISM FOR SPINNING, TWISTING, OR LIKE MACHINES.
APPLICATION FILED MAY 19, 1913.

1,119,127.

Patented Dec. 1, 1914.
2 SHEETS—SHEET 2.

WITNESSES:
M. E. Flaherty.
A. E. O'Brien.

INVENTOR:
Albert W. Thompson.
By Coale + Hayes
his attorneys.

UNITED STATES PATENT OFFICE.

ALBERT W. THOMPSON, OF LOWELL, MASSACHUSETTS, ASSIGNOR TO SACO-LOWELL SHOPS, OF BOSTON, MASSACHUSETTS, A CORPORATION OF MASSACHUSETTS.

SPINDLE-DRIVE MECHANISM FOR SPINNING, TWISTING, OR LIKE MACHINES.

1,119,127. Specification of Letters Patent. Patented Dec. 1, 1914.

Application filed May 19, 1913. Serial No. 768,422.

*To all whom it may concern:*

Be it known that I, ALBERT W. THOMPSON, of Lowell, in the county of Middlesex and State of Massachusetts, a citizen of the United States, have invented a new and useful Improvement in Spindle-Drive Mechanism for Spinning, Twisting, or like Machines, of which the following is a full, clear, and exact description, reference being had to the accompanying drawings, forming a part of this specification, in explaining its nature.

The present invention relates to an improvement in spindle drive mechanism for spinning, twisting or like machines in which the spindles are driven from a rotating drum by means of an endless tape or belt having frictional contact with the peripheral surface of the drum and spindle whirls, a group of four spindles usually being driven by each belt.

Owing to the fact that the belt is apt to stretch, a tension or compensating device is provided for taking up any slack that may develop in the belt. This tension device consists of a wheel or pulley usually arranged adjacent the drum and around which the belt is wrapped or passed. The pulley is mounted or otherwise arranged to bear with tension against the belt and to continue such bearing as the belt becomes stretched, thereby taking up and compensating for any slack that may develop. For this purpose the pulley is mounted upon a weighted lever or bell crank which swings as slack develops in the belt and accordingly holds the belt properly taut at all times. In order that those portions of the belt running onto and off the tension pulley may properly clear other running portions of the belt, it is necessary that the belt run on and off the tension pulley in directions other than at right angles to the axis of the drum. It is also desirable that the tension pulley lie within such plane that the pulley will turn upon an axis at right angles to the leading-on portion of the belt. In the usual type of tension device the pulley, though initially set to lie substantially within such a plane, is supported upon a hanger which is pivotally mounted to turn upon an axis lying parallel with the axis of the drum, with the effect that as the pulley swings through the stretching of the belt or otherwise, it will immediately move out of the plane defined by the leading-on portion of the belt and, if the swing of the pulley be of any appreciable amount, the belt will run off the pulley.

It is accordingly the object of my invention to provide a construction in which the tension pulley is maintained to swing at all times within the plane defined by the leading-on portion of the belt; in other words, to provide whereby the pulley will at all times turn upon an axis at right angles to the line of the leading-on portion of the belt, whatever the swung position of the pulley may be.

It is a further object of my invention to provide a construction of the above character admitting of a variety of adjustment in order to provide a proper and precise positioning of the tension pulley and one also by which a series of pulleys may be positioned at one time or by a single operation.

My invention can best be seen and understood by reference to the drawings, in which—

Figure 4:
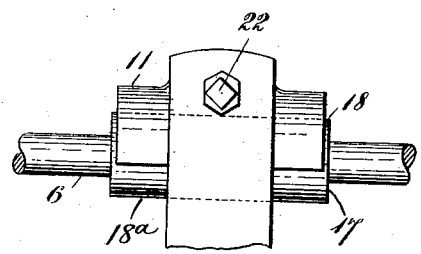
Figure 5:
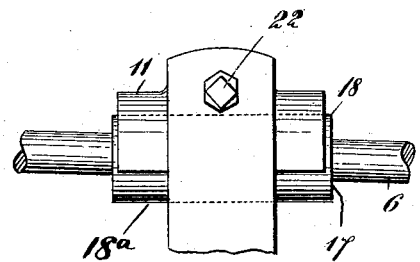
Figure 6:
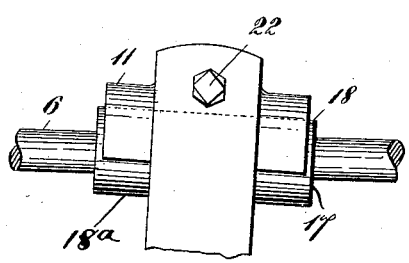
Figure 7:
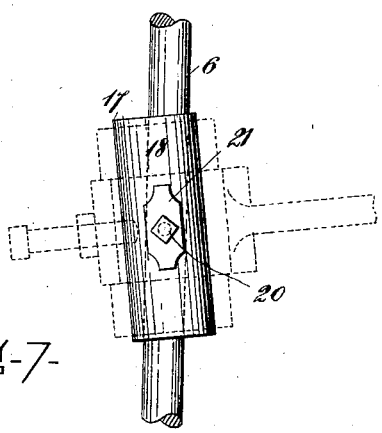

Figure 1 is a plan of the apparatus embodying my invention. Fig. 2 shows the same in side elevation. Fig. 3 is a side elevation of a portion thereof in enlarged detail. Figs. 4, 5 and 6 are front elevations of a portion of the apparatus in enlarged detail to which special reference will hereinafter be made, and Fig. 7 is a plan of the portion of the apparatus shown in Fig. 4.

Referring to the drawings:—1, 2 represent, respectively, portions of the parallelly-arranged spindle rails of a spinning, twisting or like machine, and upon which the spindles 3 are mounted. It will be understood of course that these rails are of considerable extension and a large number of spindles are mounted upon them. For purposes of illustration I have shown but four spindles, of which two are mounted upon each rail, inasmuch as this is the usual number or set of spindles driven by a single belt.

Between the rails 1 and 2 is mounted a rotatable drum 4 from which power is transmitted for rotating the spindles, the transmission of the power being effected through a tape or belt 5 which is in frictional contact with the peripheral surface of the drum and passes around the whirls of the respective spindles.

Arranged adjacent and parallel with the drum and extending the length of the machine is a rod 6. This rod acts to support the tension device for the belt, to which reference has already been made. The tension device comprises a pulley 7, around which the belt is passed, carried by a bell crank 8 mounted to swing upon and around the rod 6 and overbalanced to hold the pulley in position where it will keep the belt taut and take up any slack that may develop in it.

In further detail of construction the bell crank 8 consists of arms 9 and 10, respectively, and connecting apex or head 11 which is the part mounted upon the rod 6. The arm 9 is a forked arm and carries the pulley 7. This arm is adjustably secured to the head 11 by an adjustable connection 13 in a manner whereby the arm may be laterally turned in either direction and the pulley carried by it set in any laterally-adjusted position. The arm 10 bears upon its end an overbalancing weight 14.

The parts thus far described, or parts similar thereto and performing like functions, are well known to those skilled in the art.

By reference to Fig. 1 it will be observed that the portion 15 of the belt leading onto the tension pulley, runs crosswise the drum and rod 6 upon a line other than at right angles thereto. Inasmuch as the tension pulley should be set to turn upon an axis at right angles to said leading-on portion of the belt it must accordingly be set to turn within a plane extending other than at right angles to the axis of the drum and rod 6.

In the ordinary construction and operation of the tension device the bell crank supporting the tension pulley is mounted directly upon the rod 6 so that the tension pulley, whatever its position may be, will swing at right angles to the drum and rod upon which it is mounted. Accordingly while the tension pulley might be initially set (through lateral adjustment of the arm 9 supporting it) to lie substantially within the proper plane, yet the moment the pulley swings to take up slack in the belt or otherwise it will immediately swing out of said plane, swinging as it does at right angles to the drum and tension pulley, with the effect that the belt will no longer render properly over the tension pulley and if the tension pulley swing to any appreciable degree, the belt will run off the pulley. As said before in the preamble to the specification, it is these defects which it is my object to remedy and this I find I am able to do by mounting the bell crank to turn upon a sleeve or bushing 17 presenting a cylindrically convexed top surface 18 upon which the bell crank may turn or swing and which is itself mounted upon the rod 6, the rod extending through the sleeve by a cored hole or opening 19 therein. The center of curvature of the top cylindrical surface 18 of the bushing is out of parallel with the central longitudinal line of the hole or opening through the bushing occupying an angular relation with respect thereto or such angular relation that when the sleeve or bushing is arranged upon the rod the hanger mounted thereon will swing upon an axis extending at substantially right angles to the leading-on portion of the belt when the tension pulley will not only lie and turn within the proper plane, but swing within said plane; the pulley, in other words, continuing to turn within said plane whatever its swung position may be. The construction already described admits also of further variations which may play a very important part in effecting the properly localized or adjusted position of the tension pulley in its relation to the belt. According to the construction shown it will be observed that the center of curvature of the top cylindrical surface 18 of the bushing lies within the same plane as the longitudinal line of the hole or opening through the bushing and bisects such line at about the center thereof. The effect of this is that the sleeve or bushing may be set to occupy an exact horizontal position when the tension pulley will turn around the cylindrical surface 18 thereof upon an exact horizontal axis as shown in Fig. 4 but one out of parallel with the rod 6 as shown in Fig. 7 so that the tension pulley may continue to swing in the proper plane. While the tension of the pulley by adjustment of the arm 9 may be initially set in the proper plane, yet to facilitate such initial setting and to insure that the pulley may swing in said plane, it may be desirable that the pulley be initially set to swing upon other than an exact horizontal axis although upon an axis out of parallel with the line of the rod 6 as shown in Fig. 7. This effect may be obtained by a slightly turned adjustment of the sleeve or bushing upon the rod 6, or by turning this rod when the sleeve will be moved to occupy a position as shown for example in Fig. 5 where it will be seen that the bushing does not lie in an exact horizontal position but one in which the cylindrical bearing surface 18 thereof is out of parallel with the rod 6. By moving the sleeve upon the rod in a reverse direction or by reversely turning the rod the sleeve may be set in a position where the cylindrical surface thereof will occupy a position as shown in Fig. 6 or one reverse to that shown in Fig. 5.

It will accordingly be seen that by varying the turned position of the sleeve or bushing the tension pulley may be set at just the proper angle to swing within the proper plane. For facilitating the adjustment of the sleeve I prefer that the hole through it shall be a cylindrical hole and that the rod 6 may be a round rod properly fitting within said hole, the sleeve being fixed to the rod by a set screw 20. If desired, however, rods of other than circular cross section and bushings with holes of corresponding cross section may be employed. These have an advantage in that equal angularity in the setting of all the bushings is obtained for it will be understood that in actual practice each tension device in any machine will be mounted upon a sleeve or bushing like that above described secured to the rod 6 so that after these bushings have once been secured to the rod the adjustment of all of them may be simultaneously obtained for varying the positions of the tension pulleys simply by turning the rod 6.

While I have described the bushing as provided with a top cylindrically convexed surface providing a bearing for the hanger I prefer that the bushing may be provided with a similar cylindrically convexed surface 18ª exhibiting the same characteristics as the surface 18 as above described and which effect may be obtained by making the bushing circular in cross section. The advantage of providing the bushing with a bottom cylindrically convexed surface is that when the bushing is turned so that the bottom cylindrical surface 18ª thereof provides the bearing for the hanger the center of curvature of such surface or axis of the hanger will lie at an angle just reverse to that previously described which may be an advantage under certain circumstances of use for oftentimes it is found necessary to run the belt on to the tension pulley in the direction just reverse to that shown.

Further details of construction reside in the fact that the bushing is provided with bosses 21 upon the upper and under side thereof and through either one of which the set screw may extend. The function of these bosses is to provide a stop with which the adjustable screw 22 is adapted to have contact. This screw extends through the shell 11 of the bell crank and is adjustably set in such position as to engage the stop and prevent the bell crank from swinging so far as to allow the weight to strike and injure the drum in case the tape runs off the tension pulley. It will be understood of course that the boss projecting from the bottom surface 18ª of the bushing becomes effective only when that surface is providing a bearing for the hanger as above described.

While I have described my invention applied to a tension device set for controlling a belt running in one direction, it may of course be applied to a tension pulley controlling a belt running in a direction reverse to that shown when the bushing will occupy a position just reverse to that indicated in Fig. 1, which effect may be obtained by a half turn of the bushing on the rod 6.

Having thus fully described my invention, I claim and desire to secure by Letters Patent of the United States:—

1. The combination with a spindle drive mechanism having a rotary drum, a tension pulley, a belt leading onto said tension pulley at other than a right angle with relation to the axis of said drum, an overweighted swinging hanger bearing said pulley, a rod adjacent to said drum supporting said hanger, of a member arranged upon said rod and presenting a top cylindrically convexed surface providing a bearing for said hanger, and upon which said hanger may turn, the center of curvature of said surface of the member lying at an angle with relation to the longitudinal line of said rod.

2. The combination with a spindle drive mechanism having a rotary drum, a tension pulley, a belt leading onto said tension pulley at other than a right angle with relation to the axis of said drum, an overweighted swinging hanger bearing said pulley, a rod adjacent to said drum supporting said hanger, of a bushing with an opening therein through which said rod extends, said bushing presenting a top cylindrically convexed surface providing a bearing for said hanger, and upon which said hanger may turn, the center of curvature of said surface of the bushing lying at an angle with relation to the central longitudinal line of said opening through the bushing.

3. The combination with a spindle drive mechanism having a rotary drum, a tension pulley, a belt leading onto said tension pulley at other than a right angle with relation to the axis of said drum, an overweighted swinging hanger bearing said pulley, a rod adjacent to said drum supporting said hanger, of a bushing having an opening therein through which said rod extends, said bushing presenting a top cylindrically convexed surface providing a bearing for said hanger and upon which said hanger may turn, the center of curvature of said surface of the bushing lying at an angle with relation to the longitudinal line of said rod and opening through the bushing and means for securing said bushing to said rod whereby said hanger may turn upon an axis at substantially right angles to the plane of the leading on portion of said belt.

4. The combination with a spindle drive mechanism having a rotary drum, a tension pulley, a belt leading onto said tension pulley at other than a right angle with relation to the axis of said drum, an overweighted swinging hanger bearing said pulley, a rod adjacent to said drum supporting said hanger, of a bushing having an opening therein through which said rod extends, and presenting a top cylindrically convexed surface providing a bearing for said hanger and upon which said hanger may turn, the center of curvature of said surface of the bushing lying at an angle with relation to the central longitudinal line of said opening through the bushing and intersecting said longitudinal line at about the center thereof.

5. The combination with a spindle drive mechanism having a rotary drum, a tension pulley, a belt leading onto said tension pulley at other than a right angle with relation to the axis of said drum, an overweighted swinging hanger bearing said pulley, a rod adjacent to said drum supporting said hanger, of a bushing having an opening therein through which the said rod extends, and presenting top and bottom cylindrically convexed surfaces upon either of which said hanger may rest and turn, the center of curvature of each of said surfaces lying at an angle with relation to the central longitudinal line of said opening through the bushing, and means for securing said bushing to said rod.

6. The combination with a spindle drive mechanism having a rotary drum, a tension pulley, a belt leading onto said tension pulley at other than a right angle with relation to the axis of said drum, an overweighted swinging hanger bearing said pulley, a rod adjacent to said drum supporting said hanger, of a bushing having an opening therein through which said rod extends, and presenting a top cylindrically convexed surface providing a bearing for said hanger and upon which said hanger may rest and turn, the center of curvature of said surface lying at an angle with relation to the longitudinal line of said opening through the bushing, the said bushing having also a boss projecting from the said surface thereof and providing a stop for said hanger.

ALBERT W. THOMPSON.

Witnesses:
   IRVING D. KIMBALL,
   FRANK O. HALE.

Copies of this patent may be obtained for five cents each, by addressing the "Commissioner of Patents, Washington, D. C."